United States Patent
Tovey et al.

(10) Patent No.: US 12,418,519 B2
(45) Date of Patent: Sep. 16, 2025

(54) METHOD AND SYSTEM FOR EXCHANGING WEB AUTHENTICATION PROTOCOLS FOR PUBLIC CLOUD MIGRATIONS

(71) Applicant: JPMorgan Chase Bank, N.A., New York, NY (US)

(72) Inventors: Richard Tovey, Salisbury (GB); Katy Anton, Bristol (GB); Colin Moss, Bronx, NY (US); Vladislav Kaipetskiy, Stockholm (SE)

(73) Assignee: JPMORGAN CHASE BANK, N.A., New York, NY (US)

( * ) Notice: Subject to any disclaimer, the term of this patent is extended or adjusted under 35 U.S.C. 154(b) by 113 days.

(21) Appl. No.: 18/543,453

(22) Filed: Dec. 18, 2023

(65) Prior Publication Data

US 2025/0202875 A1 Jun. 19, 2025

(51) Int. Cl.
*H04L 9/40* (2022.01)
(52) U.S. Cl.
CPC .................................... *H04L 63/08* (2013.01)
(58) Field of Classification Search
CPC ........................................................ H04L 63/08
See application file for complete search history.

(56) References Cited

U.S. PATENT DOCUMENTS

| 11,863,530 | B1* | 1/2024 | Sreekumar | H04L 63/20 |
| 2022/0292177 | A1* | 9/2022 | Asher | G06F 21/44 |
| 2024/0039891 | A1* | 2/2024 | Tseng | H04L 63/1441 |

* cited by examiner

*Primary Examiner* — Benjamin A Kaplan
(74) *Attorney, Agent, or Firm* — GREENBLUM & BERNSTEIN, P.L.C.

(57) ABSTRACT

A system and a method for authenticating user access to a service that is hosted on a public cloud platform are provided. The method includes: receiving an access request from a user that relates to a service that is hosted on a public cloud platform; preliminarily authenticating the access request by using a legacy authentication protocol that is not sufficiently secure for accessing the first service via the public cloud platform; generating and validating, based on a result of the preliminary authentication, a legacy protocol certification; retrieving roles that are associated with the user; obtaining, based on the user roles, a token that is usable for controlling access to the service via the public cloud platform; and augmenting the access request with the token and a signature to facilitate an authentication of the access request by the public cloud platform, while excluding the legacy protocol certification.

20 Claims, 5 Drawing Sheets

METHOD AND SYSTEM FOR EXCHANGING WEB AUTHENTICATION PROTOCOLS FOR PUBLIC CLOUD MIGRATIONS

BACKGROUND

1. Field of the Disclosure

This technology generally relates to methods and systems for updating web authentication protocols, and more particularly to methods and systems for exchanging legacy web authentication protocols in order to facilitate public cloud migrations that require more modern and secure authentication protocols.

2. Background Information

Many legacy web applications that are used by organizations and their clients and associates are integrated with legacy user authentication technology. However, as increasing numbers of web applications are implemented via a public cloud, and also as security protocols increasingly require the most recent technologies in order to thwart malicious threats, the use of legacy user authentication technology has led to situations in which the use of such web applications would be considered less secure and thus more vulnerable.

The public cloud poses different security challenges compared to traditional on-premise environments, since all assets are connected to the public internet to some degree and the underlying infrastructure is multitenant and managed by a third party. These characteristics place a stronger emphasis on application identity and access management controls. Legacy authentication and authorization protocols often use techniques that are considered too vulnerable to safely use in the public cloud. This can become a blocker to applications migrating to the public cloud.

Many business-critical software applications rely on legacy authentication protocols. Within an enterprise it is common for applications to be tightly coupled to the authentication/authorization protocol used by a core monolithic platform. This coupling makes it very hard for monolithic platforms to migrate individual components, modules and services into the public cloud without major changes to that monolith. These hard dependencies derail attempts to methodically migrate smaller components to modern cloud environments and limit the risks to clients and customers. A big bang approach generally leads to a series of interdependent failures (i.e., spaghetti code) across a large suite of customer services and make it very difficult to troubleshoot.

Accordingly, there is a need for a mechanism for exchanging legacy web authentication protocols in order to facilitate public cloud migrations and/or migrations to more vulnerable/less trusted network zones that require more modern and secure authentication protocols.

SUMMARY

The present disclosure, through one or more of its various aspects, embodiments, and/or specific features or sub-components, provides, inter alia, various systems, servers, devices, methods, media, programs, and platforms for exchanging legacy web authentication protocols in order to facilitate public cloud migrations that require more modern and secure authentication protocols.

According to an aspect of the present disclosure, a method for authenticating user access to a service that is hosted on a public cloud platform is provided. The method is implemented by at least one processor. The method includes: receiving, by the at least one processor from a first user, an access request that relates to a first service that is hosted on a public cloud platform; preliminarily authenticating, by the at least one processor, the access request by using a legacy authentication protocol that is not sufficiently secure for accessing the first service via the public cloud platform; generating, based on a result of the preliminary authentication, a legacy protocol certification; validating the legacy protocol certification; obtaining a first token based on the validated certification; retrieving roles that are associated with the first user based on the first token; obtaining, based on the roles, a second token that is usable for controlling access to the first service via the public cloud platform; augmenting the access request with the second token and a signature that encodes a username associated with the user, the roles, and an expiry time, while ensuring that the augmented access request does not include the legacy protocol certification; routing the augmented access request to the public cloud platform; and when the augmented access request has been authenticated, receiving, from the public cloud platform, a connection authentication that facilitates access to the first service by the first user.

The augmentation of the access request with the second token and the signature may result in the augmented access request including information that is sufficient to enable the public cloud platform to authenticate the augmented access request with respect to accessing the first service via the public cloud platform.

The public cloud platform may include at least one from among an Amazon Web Services (AWS) cloud platform, an Azure cloud platform, and a Google cloud platform.

Each of the first token and the second token may be an Open ID Connect/Open Authorization (OIDC/OAuth) access token.

The signature may be a JavaScript Object Notation (JSON) Web Signature (JWS).

The expiry time may be a 10-second expiry time.

The validating of the legacy protocol certification may include comparing a username associated with the user and a session cookie with a previously saved username/cookie combination and then determining whether to validate the legacy protocol certification based on a result of the comparing.

The method may further include receiving, from the public cloud platform, at least one from among dynamic content and static content that relates to the service to which the access request relates. The static content may include at least one from among HyperText Markup Language (HTML) content, JavaScript (JS) content, image files, Portable Document Format (PDF) files, zip files, Microsoft Word files, Microsoft Excel files, and Cascading Style Sheets (CSS) content.

At least one from among the receiving of the request for access, the validating, and the retrieving of the roles may use Transport Layer Security (TLS) encryption.

According to another exemplary embodiment, a computing apparatus for authenticating user access to a service that is hosted on a public cloud platform is provided. The computing apparatus includes a processor; a memory; and a communication interface coupled to each of the processor and the memory. The processor is configured to: receive, via the communication interface from a first user, an access request that relates to a first service that is hosted on a public cloud platform; preliminarily authenticate the access request by using a legacy authentication protocol that is not sufficiently secure for accessing the first service via the public cloud platform; generate, based on a result of the preliminary authentication, a legacy protocol certification; validate the legacy protocol certification; obtain a first token based on the validated certification; retrieve roles that are associated with the first user based on the first token; obtain, based on the roles, a second token that is usable for controlling access to the first service via the public cloud platform; augment the access request with the second token and a signature that encodes a username associated with the user, the roles, and an expiry time, while ensuring that the augmented access request does not include the legacy protocol certification; route the augmented access request to the public cloud platform; and when the augmented access request has been authenticated, receive, from the public cloud platform, a connection authentication that facilitates access to the first service by the first user.

The augmentation of the access request with the second token and the signature may result in the augmented access request including information that is sufficient to enable the public cloud platform to authenticate the augmented access request with respect to accessing the first service via the public cloud platform.

The public cloud platform may include at least one from among an AWS cloud platform, an Azure cloud platform, and a Google cloud platform.

Each of the first token and the second token may be an OIDC/OAuth access token.

The signature may be a JWS.

The expiry time may be a 10-second expiry time.

The processor may be further configured to perform the validation of the legacy protocol certification by comparing a username associated with the user and a session cookie with a previously saved username/cookie combination and determining whether to validate the legacy protocol certification based on a result of the comparison.

The processor may be further configured to receive, from the public cloud platform, at least one from among dynamic content and static content that relates to the service to which the access request relates. The static content may include at least one from among HTML content, JS content, image files, PDF files, zip files, Microsoft Word files, Microsoft Excel files, and CSS content.

At least one from among the receiving of the request for access, the validating, and the retrieving of the roles may use TLS encryption.

According to yet another exemplary embodiment, a non-transitory computer readable storage medium storing instructions for authenticating user access to a service that is hosted on a public cloud platform is provided. The storage medium includes executable code which, when executed by a processor, causes the processor to: receive, from a first user, an access request that relates to a first service that is hosted on a public cloud platform; preliminarily authenticate the access request by using a legacy authentication protocol that is not sufficiently secure for accessing the first service via the public cloud platform; generate, based on a result of the preliminary authentication, a legacy protocol certification; validate the legacy protocol certification; obtain a first token based on the validated certification; retrieve roles that are associated with the first user based on the first token; obtain, based on the roles, a second token that is usable for controlling access to the first service via the public cloud platform; augment the access request with the second token and a signature that encodes a username associated with the user, the roles, and an expiry time, while ensuring that the augmented access request does not include the legacy protocol certification; route the augmented access request to the public cloud platform; and when the augmented access request has been authenticated, receive, from the public cloud platform, a connection authentication that facilitates access to the first service by the first user.

The augmentation of the access request with the second token and the signature may result in the augmented access request including information that is sufficient to enable the public cloud platform to authenticate the augmented access request with respect to accessing the first service via the public cloud platform.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
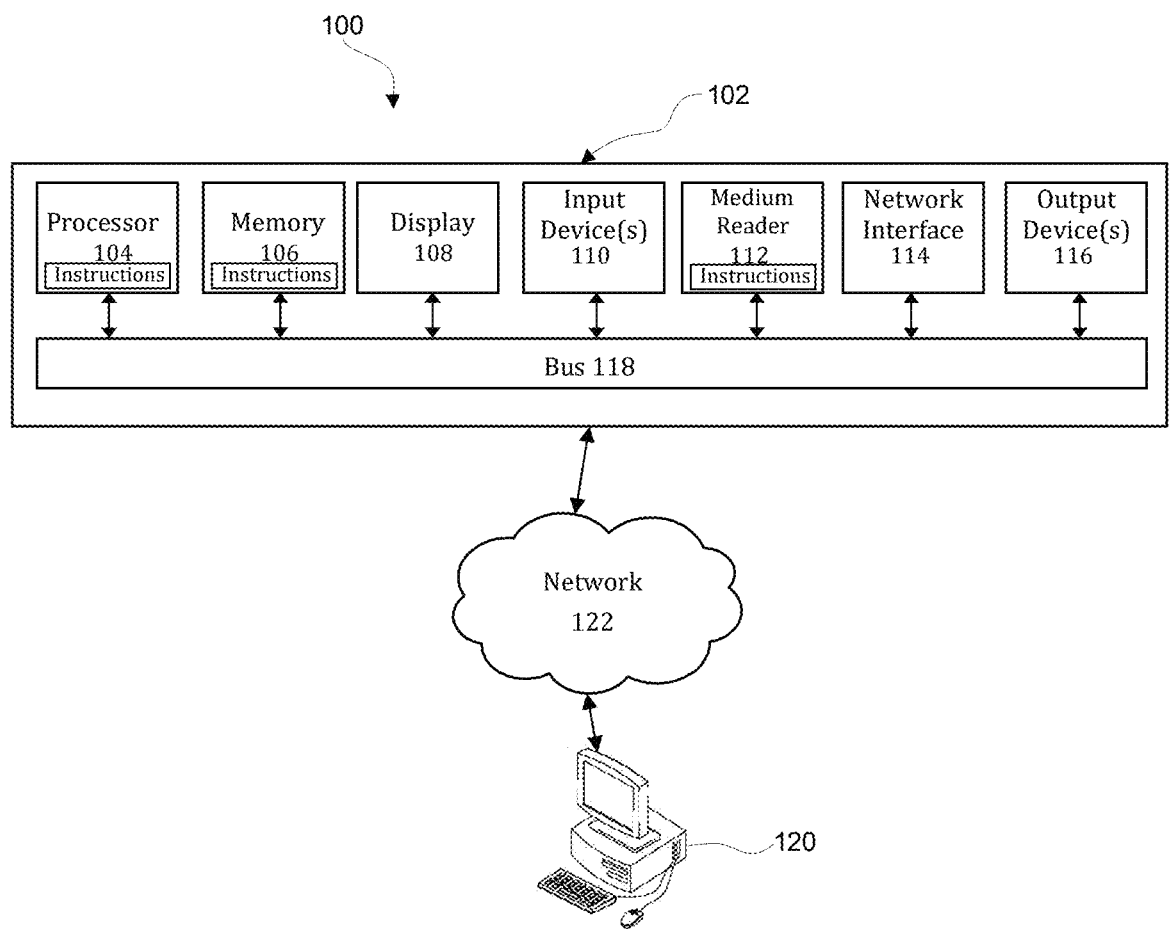
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for exchanging legacy web authentication protocols in order to facilitate public cloud migrations that require more modern and secure authentication protocols.

Figure 2:
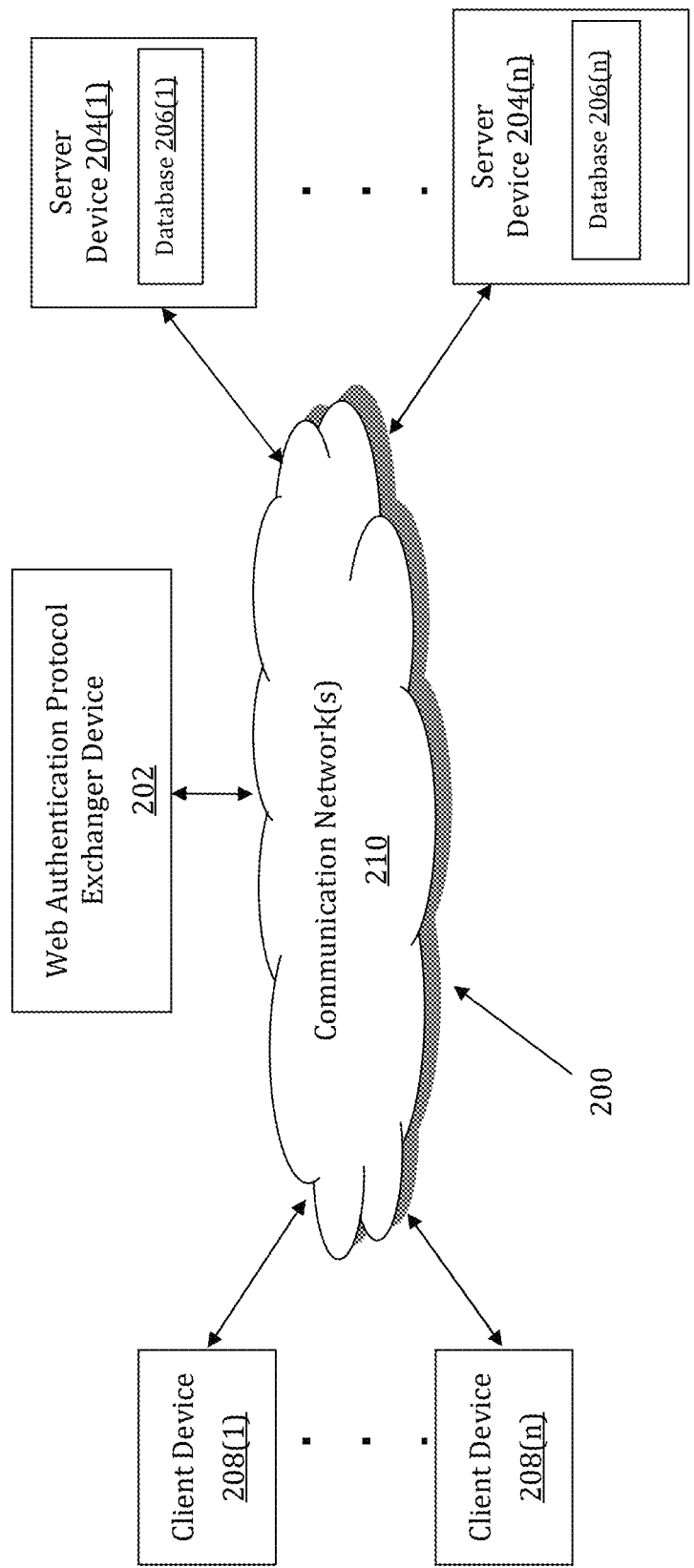
FIG. 2 illustrates an exemplary diagram of a network environment.

Referring to FIG. 2, a schematic of an exemplary network environment 200 for implementing a method for exchanging legacy web authentication protocols in order to facilitate public cloud migrations that require more modern and secure authentication protocols is illustrated. In an exemplary embodiment, the method is executable on any networked computer platform, such as, for example, a personal computer (PC).

The method for exchanging legacy web authentication protocols in order to facilitate public cloud migrations that require more modern and secure authentication protocols may be implemented by a Web Authentication Protocol Exchanger (WAPE) device 202. The WAPE device 202 may be the same or similar to the computer system 102 as described with respect to FIG. 1. The WAPE device 202 may store one or more applications that can include executable instructions that, when executed by the WAPE device 202, cause the WAPE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the WAPE device 202 itself, may be located in virtual server(s) running in a cloud-based computing environment rather than being tied to one or more specific physical network computing devices. Also, the application(s) may be running in one or more virtual machines (VMs) executing on the WAPE device 202. Additionally, in one or more embodiments of this technology, virtual machine(s) running on the WAPE device 202 may be managed or supervised by a hypervisor.

In the network environment 200 of FIG. 2, the WAPE device 202 is coupled to a plurality of server devices 204(1)-204(n) that hosts a plurality of databases 206(1)-206(n), and also to a plurality of client devices 208(1)-208(n) via communication network(s) 210. A communication interface of the WAPE device 202, such as the network interface 114 of the computer system 102 of FIG. 1, operatively couples and communicates between the WAPE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WAPE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and WAPE devices that efficiently implement a method for exchanging legacy web authentication protocols in order to facilitate public cloud migrations that require more modern and secure authentication protocols.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WAPE device 202 may be a standalone device or integrated with one or more other devices or apparatuses, such as one or more of the server devices 204(1)-204(n), for example. In one particular example, the WAPE device 202 may include or be hosted by one of the server devices 204(1)-204(n), and other arrangements are also possible. Moreover, one or more of the devices of the WAPE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WAPE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to legacy authentication protocols and information that relates to authentication requirements for public cloud migrations.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the WAPE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the WAPE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the WAPE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WAPE device 202, the server devices 204(1)-204(n), or the client devices 208(1)-208(n), for example, may be configured to operate as virtual instances on the same physical machine. In other words, one or more of the WAPE device 202, the server devices 204(1)-204(n), or the client devices 208(1)-208(n) may operate on the same physical device rather than as separate devices communicating through communication network(s) 210. Additionally, there may be more or fewer WAPE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
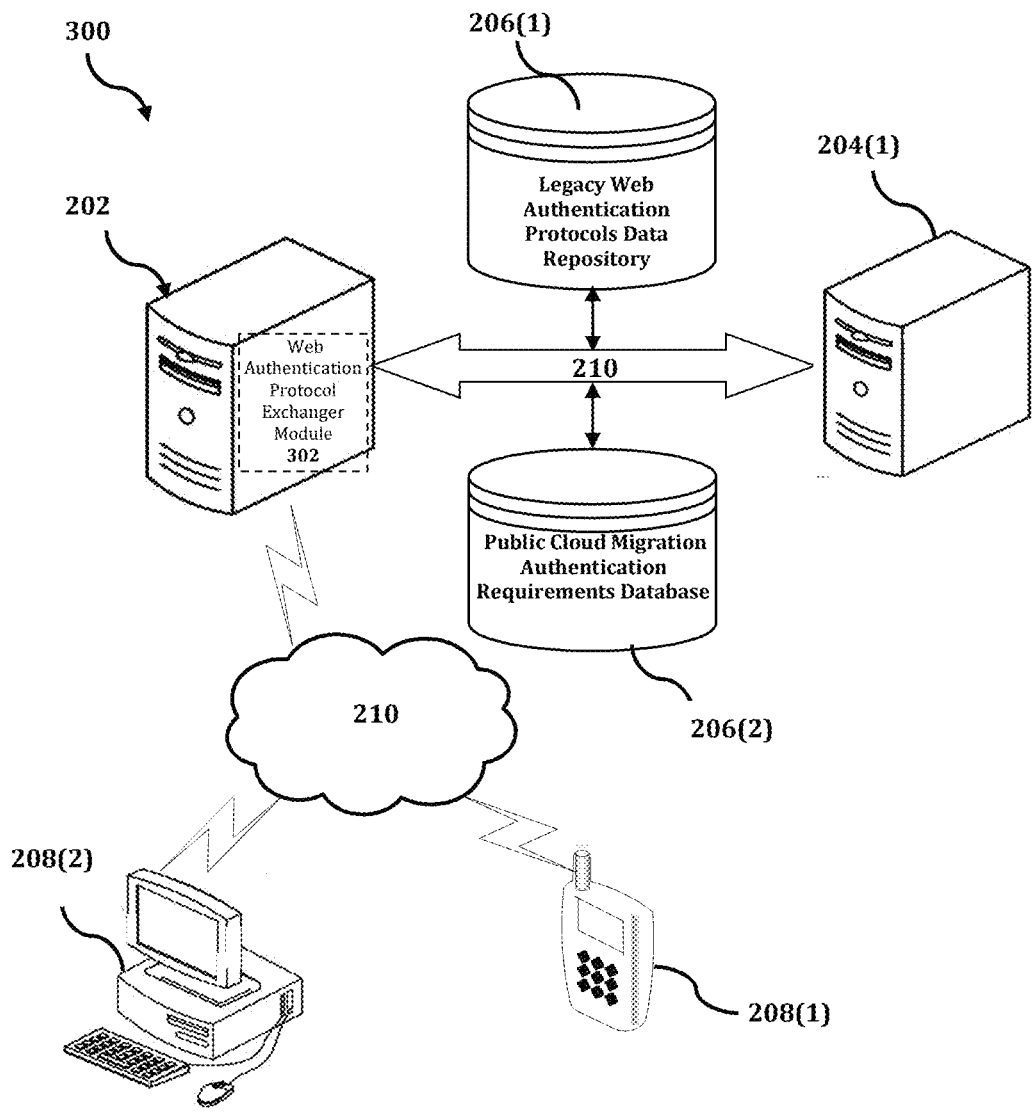
FIG. 3 shows an exemplary system for implementing a method for exchanging legacy web authentication protocols in order to facilitate public cloud migrations that require more modern and secure authentication protocols.

The WAPE device 202 is described and illustrated in FIG. 3 as including a web authentication protocol exchanger module 302, although it may include other rules, policies, modules, databases, or applications, for example. As will be described below, the web authentication protocol exchanger module 302 is configured to implement a method for exchanging legacy web authentication protocols in order to facilitate public cloud migrations that require more modern and secure authentication protocols.

An exemplary process 300 for implementing a mechanism for exchanging legacy web authentication protocols in order to facilitate public cloud migrations that require more modern and secure authentication protocols by utilizing the network environment of FIG. 2 is illustrated as being executed in FIG. 3. Specifically, a first client device 208(1) and a second client device 208(2) are illustrated as being in communication with WAPE device 202. In this regard, the first client device 208(1) and the second client device 208(2) may be "clients" of the WAPE device 202 and are described herein as such. Nevertheless, it is to be known and understood that the first client device 208(1) and/or the second client device 208(2) need not necessarily be "clients" of the WAPE device 202, or any entity described in association therewith herein. Any additional or alternative relationship may exist between either or both of the first client device 208(1) and the second client device 208(2) and the WAPE device 202, or no relationship may exist.

Further, WAPE device 202 is illustrated as being able to access a legacy web authentication protocols data repository 206(1) and a pubic cloud migration authentication requirements database 206(2). The web authentication protocols exchanger module 302 may be configured to access these databases for implementing a method for exchanging legacy web authentication protocols in order to facilitate public cloud migrations that require more modern and secure authentication protocols.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the WAPE device 202 via broadband or cellular communication. Of course, these embodiments are merely exemplary and are not limiting or exhaustive.

Upon being started, the web authentication protocols exchanger module 302 executes a process for exchanging legacy web authentication protocols in order to facilitate public cloud migrations that require more modem and secure authentication protocols. An exemplary process for exchanging legacy web authentication protocols in order to facilitate public cloud migrations that require more modern and secure authentication protocols is generally indicated at flowchart 400 in FIG. 4.

Figure 4:
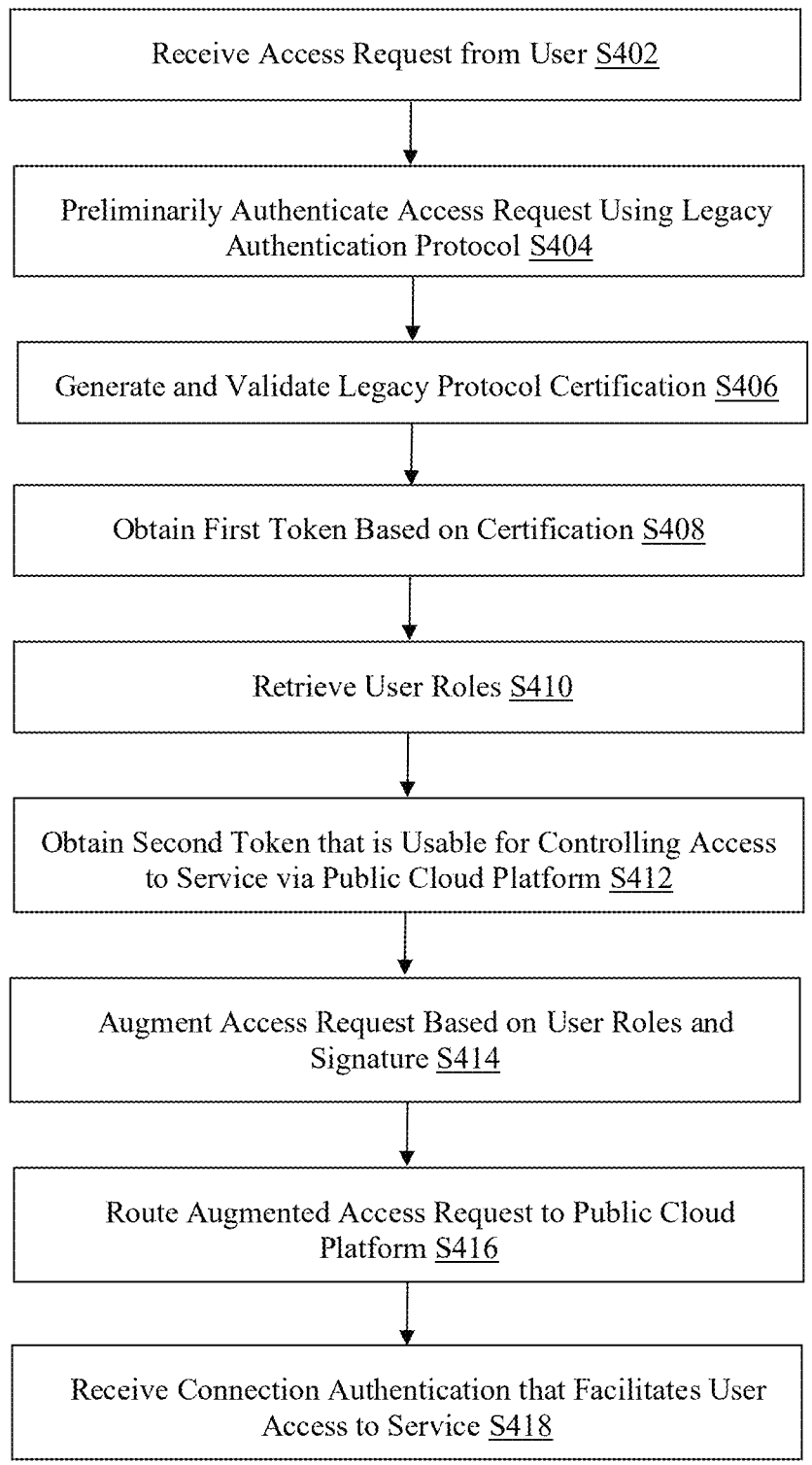
FIG. 4 is a flowchart of an exemplary process for implementing a method for exchanging legacy web authentication protocols in order to facilitate public cloud migrations that require more modern and secure authentication protocols.

In process 400 of FIG. 4, at step S402, the web authentication protocols exchanger module 302 receives a request for access to a service from a user. The service is hosted on a public cloud platform, such as, for example, an Amazon Web Services (AWS) cloud platform, an Azure cloud platform, or a Google cloud platform. In an alternative exemplary embodiment, the service may be hosted on any other type of platform (i.e., other than a public cloud platform) that is less trusted than a current platform from which a migration is contemplated. In an exemplary embodiment, the receiving of the access request may use Transport Layer Security (TLS) encryption.

At step S404, the web authentication protocols exchanger module 302 preliminarily authenticates the access request by using a legacy authentication protocol. In an exemplary embodiment, the legacy authentication protocol is not sufficiently secure for accessing the service via the public cloud platform. In this aspect, the service may previously have been directly accessible via a local server that is located on the premises of a private owner, and as such, the legacy authentication protocol may have been sufficiently secure for this previous arrangement. However, in order to facilitate a migration of the service to a public cloud platform, additional security may be required.

At step S406, the web authentication protocols exchanger module 302 generates a legacy protocol certification that is based on the result of the preliminary authentication resulting from step S404. Then, the web authentication protocols exchanger module 302 validates the legacy protocol certification. In an exemplary embodiment, the validation may be implemented by comparing a username associated with the service that is requesting the service and a session cookie with a previously saved username/cookie combination, and then determining whether or not to validate the legacy protocol certification based on a result of the comparison. In an exemplary embodiment, the validation may use TLS encryption.

At step S408, the web authentication protocols exchanger module 302 uses the validated certification to obtain a first token in order to enable access to an application programming interface (API) via which roles and/or entitlements associated with the user are available. In an alternative exemplary embodiment, instead of the first token being directly linked to the legacy protocol certification, the first token may be specific to the user roles API such that trust is established therebetween. In an exemplary embodiment, the WAPE device 202 caches the response from the user roles API for an amount of time so as to reduce response latency or reduce load on the user roles API. This amount of time varies based on specific use cases and sensitivities. At step S410, the web authentication protocols exchanger module 302 uses the first token to retrieve the user roles; and then, at step S412, the web authentication protocols exchange module 302 uses the user roles to obtain a second token that controls access to the public cloud platform implementation of the service. In an exemplary embodiment, the response from the user roles API is checked; for example, if the API returns data as a signed object, then a signature check may be performed. In addition, a high-level or coarse-grained entitlements check may be performed on the request to determine whether the request is applicable to the public cloud hosted service, and if it is determined that the user is not allowed to access this service, then the request may be rejected. Further, a decision may be made about whether to forward the traffic to the public cloud service based on the user roles and/or entitlements. In an exemplary embodiment, the first token and/or the second token is an Open ID Connect/Open Authorization (OIDC/OAuth) access token. In an exemplary embodiment, the retrieval of the user roles may use TLS encryption. In an alternative exemplary embodiment, instead of the second token being based on or directly coupled to the user roles, the WAPE device 202 obtains a broad "application to application" token to obtain access to the cloud hosted service that is based on the identity of the account running the WAPE device 202, rather than the client user.

At step S414, the web authentication protocols exchanger module 302 augments the access request based on the user roles, the second token, and a signature that encodes the user's username, the roles, and an expiry time. In an exemplary embodiment, the augmentation is performed in a manner that ensures that the augmented access request does not include the legacy protocol certification. In an exemplary embodiment, the signature may be a JSON Web Signature (JWS). In an exemplary embodiment, the expiry time may be a 10-second expiry time.

At step S416, the web authentication protocols exchanger module 302 routes the augmented access request to the public cloud platform. In an exemplary embodiment, the public cloud platform authenticates the augmented access request based on the user roles, the second token, and the signature. In an exemplary embodiment, the second token provides information that is based on the user roles and that is usable for authenticating the augmented access request. In an alternative exemplary embodiment, if the second token only identifies the WAPE device 202, then the user roles instead come from the signed object. In an exemplary embodiment, the public cloud platform may also route the augmented access request to an API associated with the public cloud platform in order to retrieve dynamic web content and/or static web content relating to the requested service, and after retrieval, the dynamic web content and/or static web content may be forwarded to the web authentication protocols exchanger module 302. In an exemplary embodiment, the API service provided by the public cloud platforms acts as a router, which enables different sources to be configured in the public cloud for static and dynamic content. The dynamic content may be served by a process that is hosted on the public cloud. In an exemplary embodiment, the process includes various operations, such as validating the signed object, validating the signature, checking that the expiry time has not passed, and extracting the user roles and/or entitlements and comparing them with the data or operation that the user is trying to perform. Any invalid requests would then be rejected by the process. The static web content may include any one or more HyperText Markup Language (HTML) content, JavaScript (JS) content, image files, Portable Document Format (PDF) files, zip files, Microsoft Word files, Microsoft Excel files, and/or Cascading Style Sheets (CSS) content. In an exemplary embodiment, content may also be uploaded by a user to the public cloud platform.

At step S418, after the public cloud platform has authenticated the augmented access request, the web authentication protocols exchanger module 302 receives a connection authentication that facilitates user access to the requested service. In an exemplary embodiment, the connection authentication is generated by a network load balancer that resides on the public cloud platform.

Figure 5:
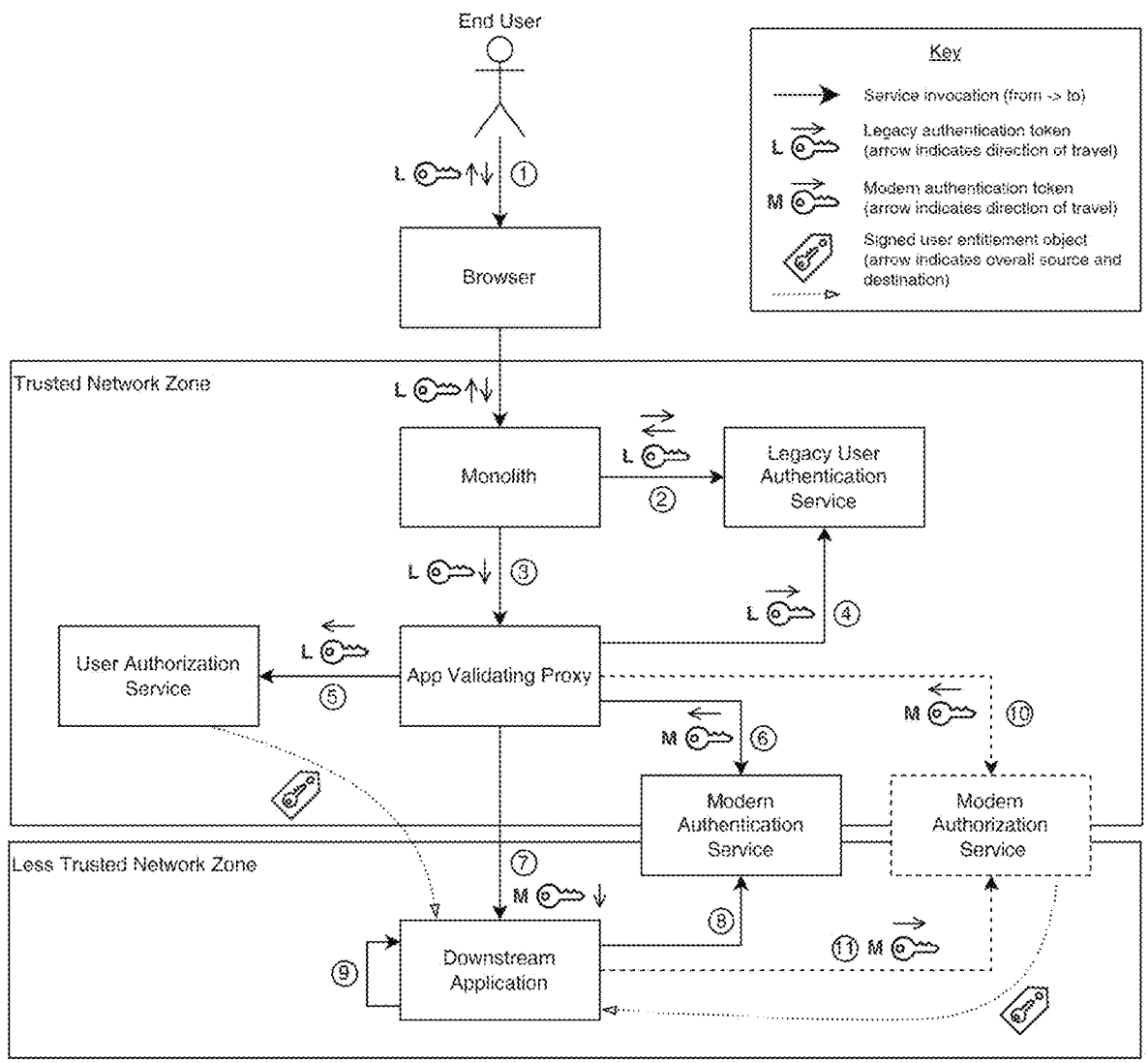
FIG. 5 is a workflow diagram that illustrates a system that implements a method for exchanging legacy web authentication protocols in order to facilitate public cloud migrations that require more modern and secure authentication protocols, according to an exemplary embodiment.

FIG. 5 is a workflow diagram 500 that illustrates a system that implements a method for exchanging legacy web authentication protocols in order to facilitate public cloud migrations that require more modern and secure authentication protocols, according to an exemplary embodiment.

Referring to FIG. 5, in an exemplary embodiment, the present disclosure introduces the App Validating Proxy (AVP): a component that is inserted between a monolith and downstream applications, thus enabling a loose coupling to be established. The AVP provides a means to transform a legacy authentication service from a broad monolithic entitlement to an attribute-based secure formatted authorization token. This limits security exposure of a full monolithic authorized session and prevents session replay attacks generally associated with legacy approaches. In this aspect, for systems that rely on the use of the legacy authentication service, downstream applications either use or are dependent on the monolith's legacy user authentication protocol.

By terminating the legacy authentication protocol in a trusted network zone, individual components, services, and modules can independently achieve modernization to a less secure network zone like the public cloud. Security uplifts and better client experience can be achieved without requiring major updates to the full monolith. By providing a means to transform the legacy authentication service from a broad monolithic entitlement to an attribute-based secure formatted authorization token, security exposure of a full monolithic authorized session is limited and session replay attacks, generally associated with legacy approaches, may be prevented or mitigated.

Referring again to FIG. 5, in step 1, an end user navigates to the Monolith using their web browser with the intention of accessing services and/or user interfaces provided by a Downstream Application. In step 2, the Monolith handles the user login against the Legacy User Authentication service, issuing the End User with a Legacy Authentication Token. On subsequent requests, the End User's browser supplies the Legacy Authentication Token which is validated against the Legacy User Authentication Service by the Monolith.

In step 3, the Monolith forwards authenticated End User requests to an App Validating Proxy (which may be specific for the desired Downstream Application), including the Legacy Authentication Token. In step 4, the App Validating Proxy validates the End User's Legacy Authentication Token against the Legacy User Authentication service, rejecting requests with invalid authentication tokens.

In step 5, the App Validating Proxy obtains the End User's entitlements from the User Authorization service, which is encapsulated as a digitally signed object with an expiry date-time. Then, in step 6, the App Validating Proxy obtains a Modern Authentication Token from the Modern Authorization service, which it will use to authenticate against the specific Downstream Application relevant to the user's request.

In step 7, the End User request is forwarded to the Downstream Application by the App Validating Proxy. The Modern Authentication Token and the Signed Entitlement Object are included in the request. Then, in step 8, the Downstream Application validates the Modern Authentication Token against the Modern Authentication Service, rejecting requests with invalid authentication tokens.

In step 9, the Downstream Application validates the Signed Entitlement Object for the End User against a well-known configuration (i.e., a public key of the User Authorization Service), applying the entitlements specified in the object in the processing of the request. Response is routed back to the End User via the App Validating Proxy and Monolith. In step 10, in a future evolution, the User Authorization Service and Modern Authentication Service may eventually be replaced by a Modern Authorization Service which provides both a single token for service authentication and End User entitlements. In addition, in step 11 in the future evolution, the dashed arrow from the Downstream Application to the Modern Authorization Service indicates a verification of the token and a potential production of an additional token via a Token Exchange mechanism, whereby the additional token contains fine-grain entitlements that are specific to the context of the Downstream Application.

Accordingly, with this technology, an optimized process for exchanging legacy web authentication protocols in order to facilitate public cloud migrations that require more modern and secure authentication protocols is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for authenticating user access to a service that is hosted on a public cloud platform, the method being implemented by at least one processor, the method comprising:

receiving, by the at least one processor from a first user, an access request that relates to a first service that is hosted on a public cloud platform;

preliminarily authenticating, by the at least one processor, the access request by using a legacy authentication protocol that is not sufficiently secure for accessing the first service via the public cloud platform;

generating, based on a result of the preliminary authentication, a legacy protocol certification;

validating the legacy protocol certification;

obtaining a first token based on the validated certification;

retrieving roles that are associated with the first user based on the first token;

obtaining, based on the roles, a second token that is usable for controlling access to the first service via the public cloud platform;

augmenting the access request with the second token and a signature that encodes a username associated with the user, the roles, and an expiry time, while ensuring that the augmented access request does not include the legacy protocol certification;

routing the augmented access request to the public cloud platform; and when the augmented access request has been authenticated, receiving, from the public cloud platform, a connection authentication that facilitates access to the first service by the first user.

2. The method of claim 1, wherein the augmentation of the access request with the second token and the signature results in the augmented access request including information that is sufficient to enable the public cloud platform to authenticate the augmented access request with respect to accessing the first service via the public cloud platform.

3. The method of claim 1, wherein the public cloud platform includes at least one from among an Amazon Web Services (AWS) cloud platform, an Azure cloud platform, and a Google cloud platform.

4. The method of claim 1, wherein each of the first token and the second token is an Open ID Connect/Open Authorization (OIDC/OAuth) access token.

5. The method of claim 1, wherein the signature is a JavaScript Object Notation (JSON) Web Signature (JWS).

6. The method of claim 1, wherein the expiry time is a 10-second expiry time.

7. The method of claim 1, wherein the validating of the legacy protocol certification comprises comparing a username associated with the user and a session cookie with a previously saved username/cookie combination and determining whether to validate the legacy protocol certification based on a result of the comparing.

8. The method of claim 1, further comprising receiving, from the public cloud platform, at least one from among dynamic content and static content that relates to the service to which the access request relates,
wherein the static content includes at least one from among HyperText Markup Language (HTML) content, JavaScript (JS) content, image files, Portable Document Format (PDF) files, zip files, Microsoft Word files, Microsoft Excel files, and Cascading Style Sheets (CSS) content.

9. The method of claim 1, wherein at least one from among the receiving of the request for access, the validating, and the retrieving of the roles uses Transport Layer Security (TLS) encryption.

10. A computing apparatus for authenticating user access to a service that is hosted on a public cloud platform, the computing apparatus comprising:
a processor;
a memory; and
a communication interface coupled to each of the processor and the memory,
wherein the processor is configured to:
receive, via the communication interface from a first user, an access request that relates to a first service that is hosted on a public cloud platform;
preliminarily authenticate the access request by using a legacy authentication protocol that is not sufficiently secure for accessing the first service via the public cloud platform;
generate, based on a result of the preliminary authentication, a legacy protocol certification;
validate the legacy protocol certification;
obtain a first token based on the validated certification;
retrieve roles that are associated with the first user based on the first token;
obtain, based on the roles, a second token that is usable for controlling access to the first service via the public cloud platform;
augment the access request with the second token and a signature that encodes a username associated with the user, the roles, and an expiry time, while ensuring that the augmented access request does not include the legacy protocol certification;
route the augmented access request to the public cloud platform; and
when the augmented access request has been authenticated, receive, from the public cloud platform, a connection authentication that facilitates access to the first service by the first user.

11. The computing apparatus of claim 10, wherein the augmentation of the access request with the second token and the signature results in the augmented access request including information that is sufficient to enable the public cloud platform to authenticate the augmented access request with respect to accessing the first service via the public cloud platform.

12. The computing apparatus of claim 10, wherein the public cloud platform includes at least one from among an Amazon Web Services (AWS) cloud platform, an Azure cloud platform, and a Google cloud platform.

13. The computing apparatus of claim 10, wherein each of the first token and the second token is an Open ID Connect/Open Authorization (OIDC/OAuth) access token.

14. The computing apparatus of claim 10, wherein the signature is a JavaScript Object Notation (JSON) Web Signature (JWS).

15. The computing apparatus of claim 10, wherein the expiry time is a 10-second expiry time.

16. The computing apparatus of claim 10, wherein the local server is further configured to perform the validation of the legacy protocol certification by comparing a username associated with the user and a session cookie with a previously saved username/cookie combination and determining whether to validate the legacy protocol certification based on a result of the comparison.

17. The computing apparatus of claim 10, wherein the processor is further configured to receive, from the public cloud platform, at least one from among dynamic content and static content that relates to the service to which the access request relates,
wherein the static content includes at least one from among HyperText Markup Language (HTML) content, JavaScript (JS) content, image files, Portable Document Format (PDF) files, zip files, Microsoft Word files, Microsoft Excel files, and Cascading Style Sheets (CSS) content.

18. The computing apparatus of claim 10, wherein at least one from among the receiving of the request for access, the validating, and the retrieving of the roles uses Transport Layer Security (TLS) encryption.

19. A non-transitory computer readable storage medium storing instructions for authenticating user access to a service that is hosted on a public cloud platform, the storage medium comprising executable code which, when executed by a processor, causes the processor to:
receive, from a first user, an access request that relates to a first service that is hosted on a public cloud platform;
preliminarily authenticate the access request by using a legacy authentication protocol that is not sufficiently secure for accessing the first service via the public cloud platform;
generate, based on a result of the preliminary authentication, a legacy protocol certification;
validate the legacy protocol certification;
obtain a first token based on the validated certification;
retrieve roles that are associated with the first user based on the first token;
obtain, based on the roles, a second token that is usable for controlling access to the first service via the public cloud platform;
augment the access request with the second token and a signature that encodes a username associated with the user, the roles, and an expiry time, while ensuring that the augmented access request does not include the legacy protocol certification;
route the augmented access request to the public cloud platform; and
when the augmented access request has been authenticated, receive, from the public cloud platform, a connection authentication that facilitates access to the first service by the first user.

20. The storage medium of claim 19, wherein the augmentation of the access request with the second token and the signature results in the augmented access request including information that is sufficient to enable the public cloud platform to authenticate the augmented access request with respect to accessing the first service via the public cloud platform.

* * * * *